US012650046B2

(12) United States Patent
Elie et al.

(10) Patent No.: US 12,650,046 B2
(45) Date of Patent: Jun. 9, 2026

(54) EXTENDED SWING CLOSURE MEMBER SYSTEMS FOR MOTOR VEHICLES

(71) Applicant: FORD GLOBAL TECHNOLOGIES, LLC, Dearborn, MI (US)

(72) Inventors: Larry Dean Elie, Ypsilanti, MI (US); Timothy J. Potter, Dearborn, MI (US); Michael M. Azzouz, Farmington, MI (US); Ireneusz Trybula, South Lyon, MI (US); John Wayne Jaranson, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 907 days.

(21) Appl. No.: 17/667,653

(22) Filed: Feb. 9, 2022

(65) Prior Publication Data

US 2023/0250686 A1 Aug. 10, 2023

(51) Int. Cl.
| | |
|---|---|
| *E05F 15/63* | (2015.01) |
| *B60J 5/04* | (2006.01) |
| *E05D 3/14* | (2006.01) |

(52) U.S. Cl.
CPC .............. *E05F 15/63* (2015.01); *B60J 5/047* (2013.01); *E05D 3/147* (2013.01); *E05Y 2201/638* (2013.01); *E05Y 2201/686* (2013.01); *E05Y 2201/688* (2013.01); *E05Y 2600/626* (2013.01); *E05Y 2900/532* (2013.01)

(58) Field of Classification Search
CPC .... B60J 5/047; B60J 1/05; E05F 15/63; E05F 15/614; E05D 3/147; E05D 3/127; E05D 5/062; E05D 3/145
See application file for complete search history.

(56) References Cited

U.S. PATENT DOCUMENTS

| | | | | |
|---|---|---|---|---|
| 4,470,170 | A * | 9/1984 | Gerteis | E05D 3/16 16/334 |
| 5,685,046 | A * | 11/1997 | Neag | E05D 3/127 16/334 |
| 6,550,845 | B1 * | 4/2003 | Pietryga | B60J 5/0479 16/334 |
| 6,938,303 | B2 | 9/2005 | Watson et al. | |
| 7,540,554 | B2 * | 6/2009 | Bals | E05F 15/63 296/146.4 |
| 7,950,109 | B2 * | 5/2011 | Elliott | E05D 3/127 296/146.12 |
| 9,458,653 | B2 * | 10/2016 | Wickliffe | B60J 5/04 |
| 9,562,382 | B2 * | 2/2017 | Dey | E05D 11/1014 |

(Continued)

FOREIGN PATENT DOCUMENTS

| | | |
|---|---|---|
| EP | 0556679 A1 | 8/1993 |
| WO | 2006/072232 A1 | 7/2006 |

*Primary Examiner* — Jason S Morrow
(74) *Attorney, Agent, or Firm* — Vichit Chea; Carlson, Gaskey & Olds, P.C.

(57) ABSTRACT

Exemplary closure member systems for motor vehicles may include one or more power hinge assemblies, non-powered hinge assemblies, or both and are configured to displace a closure member to a fully open position of at least 100 degrees relative to its closed position. The hinge assemblies may embody a multi-axis design for moving the closure member between the closed and fully open positions. The closure member systems may be further configured to move the closure member along different swing paths during an opening sequence and a closing sequence.

19 Claims, 7 Drawing Sheets

(56)  References Cited

U.S. PATENT DOCUMENTS

| | | | |
|---|---|---|---|
| 9,816,302 B2 * | 11/2017 | Shepherd | E05F 5/006 |
| 10,787,847 B2 * | 9/2020 | Elie | B60J 5/0468 |
| 10,876,341 B2 * | 12/2020 | Taylor | E05F 15/41 |
| 11,142,937 B2 * | 10/2021 | Kaburaki | E05F 15/60 |
| 11,466,504 B2 * | 10/2022 | Reiter | E05F 15/63 |
| 11,831,268 B2 * | 11/2023 | Krushel | E05F 15/63 |
| 11,970,892 B2 * | 4/2024 | Throop | E05D 11/06 |
| 2005/0184556 A1 * | 8/2005 | Nania | E05D 3/127 |
| | | | 296/146.12 |
| 2017/0211308 A1 * | 7/2017 | Kitamura | E05F 15/616 |
| 2018/0126830 A1 | 5/2018 | Lampsa | |
| 2019/0241053 A1 * | 8/2019 | Desai | B60J 1/14 |
| 2023/0203862 A1 * | 6/2023 | Yun | E05D 3/122 |
| | | | 16/233 |
| 2024/0075794 A1 * | 3/2024 | Shimizu | E05F 7/005 |

* cited by examiner

EXTENDED SWING CLOSURE MEMBER SYSTEMS FOR MOTOR VEHICLES

TECHNICAL FIELD

This disclosure relates to motor vehicles, and more particularly to vehicle closure member systems that are capable of providing extended swing paths.

BACKGROUND

Motor vehicles typically include one or more closure members. Exemplary closure members are doors, swing gates, and liftgates. Generally, closure members can be moved between open and closed positions relative to a body structure of the vehicle in order to provide vehicle ingress/egress. Some closure members can be moved with powered actuators.

SUMMARY

A vehicle closure member system according to an exemplary aspect of the present disclosure includes, among other things, a closure member, a non-powered hinge assembly mounted to the closure member, and a power hinge assembly mounted to the closure member and adapted to move the closure member between a closed position and a fully open position. The closure member is displaced by at least 100 degrees from the closed position when moved to the fully open position.

In a further non-limiting embodiment of the foregoing vehicle closure member system, the closure member is a rear out-swinging door.

In a further non-limiting embodiment of either of the foregoing vehicle closure member systems, the closure member is displaced by about 270 degrees from the closed position when moved to the fully open position.

In a further non-limiting embodiment of any of the foregoing vehicle closure member systems, the power hinge assembly includes an electric motor, a main link, a drive link, a supporting link, a first mounting plate, and a second mounting plate.

In a further non-limiting embodiment of any of the foregoing vehicle closure member systems, the electric motor includes a drive shaft configured to rotate about a primary pivot axis to move the drive link along an arced path.

In a further non-limiting embodiment of any of the foregoing vehicle closure member systems, the supporting link is connected to the drive link at a first secondary pivot axis and is connected to the first mounting plate at a second secondary pivot axis.

In a further non-limiting embodiment of any of the foregoing vehicle closure member systems, the main link is connected to the first mounting plate at a third secondary pivot axis.

In a further non-limiting embodiment of any of the foregoing vehicle closure member systems, the main link, the drive link, the supporting link, and the first mounting plate are configured to articulate relative to one another to reorient their respective positions as the closure member moves between the closed position and the fully open position.

In a further non-limiting embodiment of any of the foregoing vehicle closure member systems, the closure member is mounted to the first mounting plate.

In a further non-limiting embodiment of any of the foregoing vehicle closure member systems, the power hinge assembly further includes a spring loaded cam assembly that includes a spring, a pawl, and a roller that is mounted to the pawl.

In a further non-limiting embodiment of any of the foregoing vehicle closure member systems, the roller is received within a first detent of a pivot housing of the main link when the closure member is in the closed position and is received within a second detent of the pivot housing when the closure member is in the fully open position.

In a further non-limiting embodiment of any of the foregoing vehicle closure member systems, the closure member includes a first swing path when moved from the closed position to the fully open position and includes a second swing path when moved from the fully open position to the closed position. The second swing path is a different swing path than the first swing path.

In a further non-limiting embodiment of any of the foregoing vehicle closure member systems, a control module is configured to control movement of the closure member between the closed position and the fully open position in response to a predefined prompt or an object detection signal.

A vehicle according to an exemplary aspect of the present disclosure includes, among other things, a vehicle body, a closure member mounted for movement relative to the vehicle body, and a power hinge assembly configured to automatically move the closure member during an opening sequence and a closing sequence. The power hinge assembly is configured to move the closure member along a first swing path during the opening sequence and along a second, different swing path during the closing sequence.

In a further non-limiting embodiment of the foregoing vehicle, the vehicle is an autonomous vehicle and the closure member is a rear out-swinging door.

In a further non-limiting embodiment of either of the foregoing vehicles, the power hinge assembly includes a single electric motor, a main link, a drive link, a supporting link, a first mounting plate, and a second mounting plate.

In a further non-limiting embodiment of any of the foregoing vehicles, the first mounting plate is mounted to the closure member, and the second mounting plate is mounted to the vehicle body within a pocket of a panel of the vehicle body.

In a further non-limiting embodiment of any of the foregoing vehicles, a first rotational movement of the drive link about a primary pivot axis is configured to initiate a second rotational movement of the main link about the primary pivot axis.

In a further non-limiting embodiment of any of the foregoing vehicles, rotation of the drive link about a primary pivot axis is configured to initiate articulations between the drive link and the supporting link at a first secondary pivot axis, between the supporting link and the first mounting plate at a second secondary pivot axis, and between the main link and the first mounting plate at a third secondary pivot axis.

In a further non-limiting embodiment of any of the foregoing vehicles, a control module is configured to command the power hinge assembly to move the closure member between the closed position and the fully open position in response to receiving a predefined prompt or an object detection signal.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary closure member systems for motor vehicles. Exemplary closure member systems may include one or more power hinge assemblies, non-powered hinge assemblies, or both and are configured to displace a closure member to a fully open position of at least 100 degrees relative to its closed position. The hinge assemblies may embody a multi-axis design for moving the closure member between the closed and fully open positions. The closure member systems may be further configured to move the closure member along different swing paths during an opening sequence and a closing sequence. These and other features of this disclosure are described in greater detail below.

Figures 1, 2, 3:
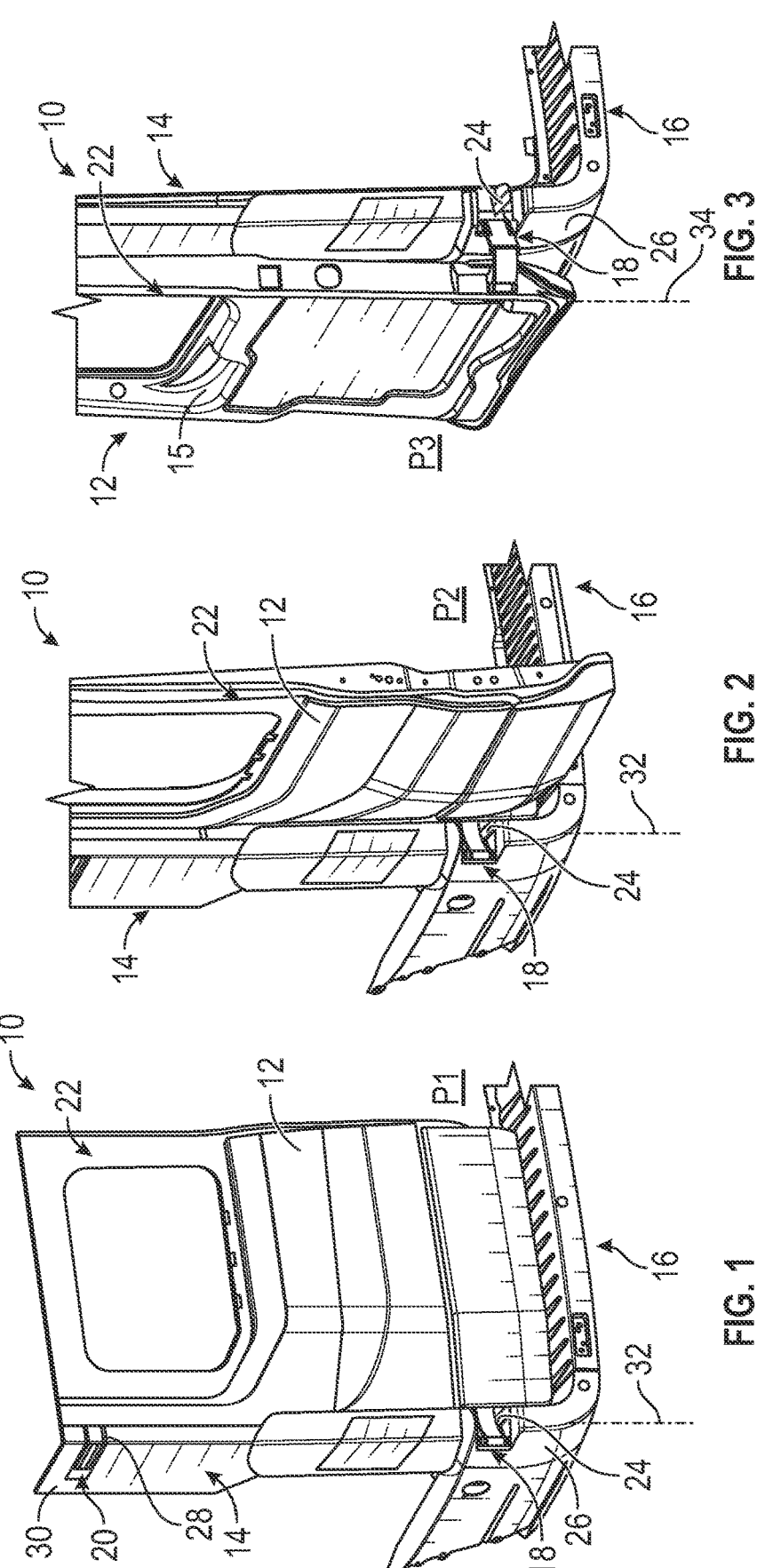
FIG. 1 illustrates a vehicle equipped with a closure member system. The closure member system is shown in a closed position in FIG. 1.
FIG. 2 illustrates the closure member system of FIG. 1 in a partially open position.
FIG. 3 illustrates the closure member system of FIG. 1 in a fully open position.

FIGS. 1, 2, and 3 schematically illustrate select portions of a motor vehicle 10 (hereinafter referred to simply as "vehicle"). The vehicle 10 may be a car, a truck, a van, a sport utility vehicle, a hearse, semi tractor-trailer, or any other type of vehicle. The vehicle 10 could also be a conventional motor vehicle, a traction battery powered hybrid or electric vehicle, or an autonomous vehicle (i.e., a driverless vehicle).

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component.

The vehicle 10 may include one or more closure members 12 that are mounted relative to a vehicle body 14 and configured to move between closed and open positions for accessing a vehicle interior (e.g., a cargo space, a passenger cabin, etc.). In the illustrated embodiment, the closure member 12 is mounted at a rear 16 of the vehicle 10 and is configured as a rear out-swinging door. In some implementations, the closure member 12 may be part of a dual out-swinging door system that may be provided at the rear 16 of the vehicle 10 for gaining access to the vehicle interior, such as for loading and/or unloading cargo, for example. However, the teachings of this disclosure are not limited to rear out-swinging type doors and could apply to various other types of closure members, including but not limited to side doors, swing gates, tailgates, hearse back doors, semi tractor-trailer tracked doors, etc.

The closure member 12 may be movably mounted to the vehicle body 14 by a first hinge assembly 18 and a second hinge assembly 20. Together, the closure member 12, the first hinge assembly 18, and the second hinge assembly 20 may establish a closure member system 22 of the vehicle 10. Although two hinge assemblies are illustrated in this embodiment, the closure member system 22 could include a greater number hinge assemblies, such as for accommodating relatively large closure members, for example.

In an embodiment, one of the first hinge assembly 18 or the second hinge assembly 20 may be a power hinge assembly, and the other of the first hinge assembly 18 or the second hinge assembly 20 may be a non-powered hinge assembly. In another embodiment, both the first hinge assembly 18 and the second hinge assembly 20 may be configured as power hinge assemblies. In yet another embodiment, both the first hinge assembly 18 and the second hinge assembly 20 may be configured as non-powered hinge assemblies. Therefore, the closure member system 22 may be either a powered closure member system or a non-powered closure member system.

The closure members 12 is shown in a closed position P1 in FIG. 1, in a partially open position P2 in FIG. 2, and in a fully open position P3 in FIG. 3. When opened to either the partially open position P2 or the fully open position P3, the closure member 12 permits users to gain access to the vehicle interior. When closed, the closure member 12 provides a barrier between the interior and the exterior of the vehicle 10. In the fully open position P3, an interior surface 15 of the closure member 12 may face in a direction away from the vehicle body 13 and the vehicle interior.

For powered embodiments, the closure member system 22 may be automatically moved between the closed position P1 and the partially open position P2 and/or the fully open position P3. For non-powered embodiments, the closure member system 22 may be manually moved between the closed position P1 and the partially open position P2 and/or the fully open position P3. In either the partially open position P2 or the fully open position P3, users may access the vehicle interior, such as for placing cargo items within the vehicle 10 or removing cargo items from the vehicle 10. The vehicle 10 can therefore be utilized for delivering or picking up cargo items such as goods, packages, etc.

The partially open position P2 of FIG. 2 may be displaced about 90 degrees from the closed position P1, and the fully open position P3 may be displaced about 100 degrees or more from the closed position P1. In some implementations, the fully open position P3 is displaced by about 180 degrees from the closed position P1. In other implementations, the fully open position P3 is displaced by about 270 degrees from the closed position P1. In this disclosure, the term "about" means that the expressed quantities or ranges need not be exact but may be approximated and/or larger or smaller, reflecting acceptable tolerances, conversion factors, measurement error, etc. The total range of motion of the closure member 12 may vary and is dependent on various design criteria.

The first hinge assembly 18 may be packaged within a pocket 24 established by a first panel 26 of the vehicle body 14, and the second hinge assembly 20 may be similarly packaged within a pocket 28 of a second panel 30 of the vehicle body 14. The first and second hinge assemblies 18, 20 may be packaged such that all subcomponents thereof are positioned inboard of an outer profile 32 of the vehicle body 14 when in the closed position P1 and the partially open position P2. Moreover, the first and second hinge assemblies 18, 20 may be positioned inboard of an outer profile 34 of the closure member 12 when the closure member 12 is moved to the fully open position P3 of FIG. 3. Thus, both the first hinge assembly 18 and the second hinge assembly 20 are substantially protected from damage during conditions such as accidents, weather, vandalism, theft, etc. for each and every position P1, P2, and P3.

Figure 4:
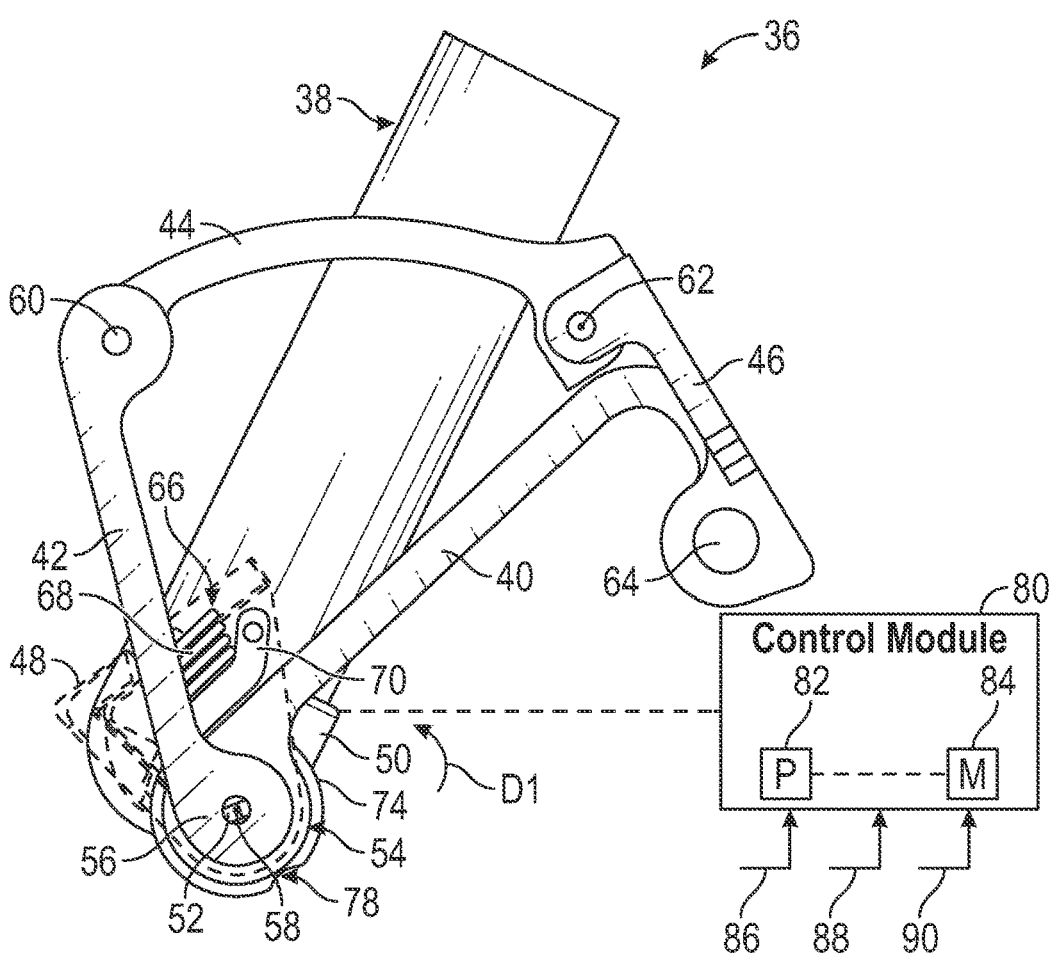
FIG. 4 illustrates an exemplary power hinge assembly of a closure member system.

FIG. 4, with continued reference to FIGS. 1-3, illustrates an exemplary power hinge assembly 36 that may be incorporated as part of the closure member system 22. The first hinge assembly 18, the second hinge assembly 20, or both may incorporate the design of the power hinge assembly 36 for providing a powered closure member system. In an exemplary implementation, only one of the first hinge assembly 18 or the second hinge assembly 20 embodies the design of the power hinge assembly 36 in order to simply the design and operation of the closure member system 22. Accordingly, the closure member 12 may be powered between the closed and open positions via a single powered actuator (e.g., a single electric motor).

The power hinge assembly 36 may include, among other things, an electric motor 38, a main link 40, a drive link 42, a supporting link 44, a first mounting plate 46, and a second mounting plate 48. Each of these subcomponents of the power hinge assembly 36 is further detailed below.

The electric motor 38 is configured to power movement of the closure member 12 between the closed position P1 and the partially open position P2 and between the partially open position P2 and the fully open position P3. The electric motor 38 may include a gearbox 50. The gearbox 50 may be configured as a right angle drive unit of the electric motor 38. In an embodiment, the gearbox 50 houses a worm drive (not shown) that includes a worm wheel and a worm that function together to rotate a drive shaft 52. Notably, the user of a worm drive may eliminate the need for latching features and reduce the size of the electric motor 38. In yet another embodiment, the gearbox 50 houses a planetary gear set. However, other gearbox configurations are further contemplated as within the scope of this disclosure.

The electric motor 38 may be selectively powered (e.g., via a power source of the vehicle 10) to rotate the drive shaft 52. The drive shaft 52 may extend through a pivot housing 54 of the main link 40 and may be fixedly connected to connector arms 56 of the drive shaft 52 that are located at both sides of the pivot housing 54. The drive shaft 52 may therefore establish a primary pivot axis 58 about which the main link 40 and the drive link 42 may rotate. As further discussed below, rotation of the drive shaft 52 is configured to cause the drive link 42 to begin to move about the primary pivot axis 58 for initiating an opening sequence or a closing sequence of the closure member 12.

The supporting link 44 may connect between the drive link 42 and the first mounting plate 46. The supporting link 44 may be operably coupled to the drive link 42 at a first secondary pivot axis 60 and may be further operably coupled to the first mounting plate 46 at a second secondary pivot axis 62. The drive link 42 and the supporting link 44 may each articulate about the first secondary pivot axis 60 to reorient their respective positions as the power hinge assembly 36 moves between the various positions P1, P2, and P3, and the supporting link 44 and the first mounting plate 46 may each articulate about the second secondary pivot axis 62 to reorient their respective positions as the power hinge assembly 36 moves between the various positions P1, P2, and P3.

The main link 40 may connect to the first mounting plate 46 at an opposite end from the pivot housing 54. The main link 40 may be operable coupled to the first mounting plate 46 at a third secondary pivot axis 64. The main link 40 and the first mounting plate 46 may each articulate about the third secondary pivot axis 64 to reorient their respective positions as the power hinge assembly 36 moves between the various positions P1, P2, and P3.

The power hinge assembly 36 may be mounted to the closure member 12 via the first mounting plate 46 and may further be mounted to the vehicle body 14 via the second mounting plate 48. The mounting of the power hinge assembly may be achieved in any suitable manner, including but not limited to bolting, welding, etc.

Figure 5:
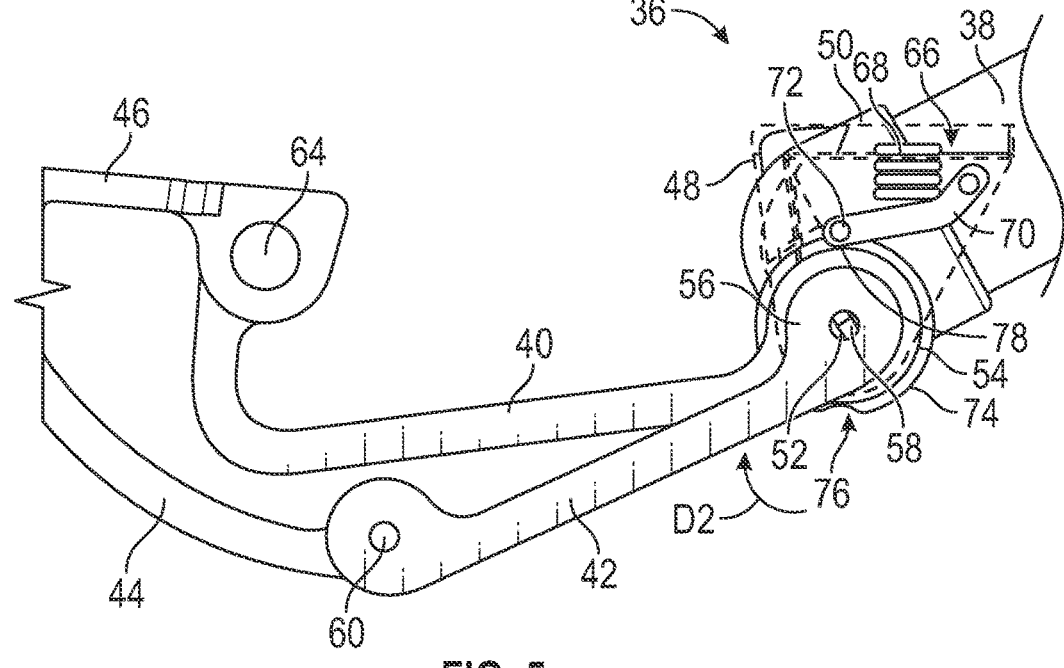
FIG. 5 illustrates select features associated with a spring loaded cam assembly of the power hinge assembly of FIG. 4.

Referring now to FIGS. 4 and 5, the power hinge assembly 36 may further include a spring loaded cam assembly 66. The spring loaded cam assembly 66 may be at least partially housed within the second mounting plate 48 and may function to arrest further motion of the power hinge assembly 36 when the closure member 12 is moved to either the closed position P1 or the fully open position P3. The spring loaded cam assembly 66 is therefore at least partially responsible for controlling the lower and upper limits of the swing path of the closure member 12 during operation of the power hinge assembly 36.

The exemplary spring loaded cam assembly 66 may include a spring 68, a pawl 70, and a roller 72. The spring 68 is configured to bias the pawl 70 toward the pivot housing 54 of the main link 40. The roller 72 may be attached to the pawl 70 and is configured to interface with a protruding ring 74 of the pivot housing 54. As the pivot housing 54 rotates about the primary pivot axis 58 during operation of the power hinge assembly 36, the protruding ring 74 may engage the roller 72, thereby causing the roller 72 to rotate with a relatively low rolling resistance in order to provide smooth arced movement of the main link 40 during operation of the power hinge assembly 36.

A first detent 76 and a second detent 78 may be formed in the protruding ring 74 of the pivot housing 54. In an embodiment, the second detent 78 is diametrically opposed from the first detent 76. However, other configurations may also be suitable depending on the desired lower and upper limits of the swing path. Moreover, additional detents could be provided if a greater number of stop locations are desirable.

The roller 72 may be received within the first detent 76 to arrest further movement in a first direction D1 beyond the closed position P1 (see FIG. 4). The roller 72 may be received within the second detent 78 to arrest further movement in a second direction D2 beyond the fully open position P3 (see FIG. 5).

Referring now primarily to FIG. 4, a control module 80 may control various functions of the power hinge assembly 36, including but not limited to controlling the power hinge assembly 36 in order to remotely (e.g., while the user is away from the vehicle interior) open or close the closure member 12. Although shown as a single control module in the highly schematic depiction of FIG. 4, the control module 80 could be part of a vehicle control system that includes multiple controllers configured to function together for coordinating and controlling the operations of the closure member system 22.

The control module 80 may include a processing unit 82 and non-transitory memory 84 for executing the various control strategies and modes of the closure member system 22. The processing unit 82 can be programmed to execute one or more programs stored in the memory 84. The programs may be stored in the memory 84 as software code, for example. Each program stored in the memory 84 may include an ordered list of executable instructions for implementing logical functions associated with opening and closing the closure member 12, for example. The processing unit 82 can be a custom made or commercially available processor, a central processing unit (CPU), or generally any device for executing software instructions. The memory 84 can include any one or combination of volatile memory elements and/or nonvolatile memory elements.

In an embodiment, the electric motor 38 of the power hinge assembly 36 may be commanded to automatically power operations of the power hinge assembly 36 in order to automatically move the closure member 12 from the closed position P1 to the fully open position P3 (or any position therebetween) in response to a first predefined prompt 86 received at the control module 80. The first predefined prompt 86 may indicate that an authorized user of the vehicle 10 desires to either place a package, goods, and/or other cargo items within the vehicle interior or desires to remove the package, goods, and/or other cargo items from the vehicle interior, and thus that the power hinge assembly 36 should be commanded to move to an open position. The control module 80 may receive the first predefined prompt 86 when the user authenticates themselves using a keyfob linked to vehicle 10 or a personal electronic device (e.g., smart phone) that is capable of communicating with the control module 80 through an application stored in the memory of the personal electronic device, for example.

In another embodiment, the electric motor 38 of the power hinge assembly 36 may be commanded to automatically power operations of the power hinge assembly 36 in order to move the closure member 12 from the fully open position P3 to the closed position P1 in response to a second predefined prompt 88 received at the control module 80. The second predefined prompt 88 may indicate that the authorized user of the vehicle 10 desires to drive the vehicle 10 away from its current location, such as when cargo loading/unloading has been completed. The control module 80 may receive the second predefined prompt 88 from a keyfob or a personal electronic device of an authorized user, for example.

In yet another embodiment, the control module 80 may be programmed to control the power hinge assembly 36 in response to an object detection signal 90 that may be received from a sensor system (not shown) of the vehicle 10. The object detection signal 90 is an input signal that may indicate that an object or person has been detected within the swing path of the closure member 12. In response to receiving the input signal 90, the control module 80 may command the electric motor 38 to reverse the current direction of movement of the closure member 12 (e.g., by rotating the drive shaft 52 in an opposite direction).

Figure 6A:
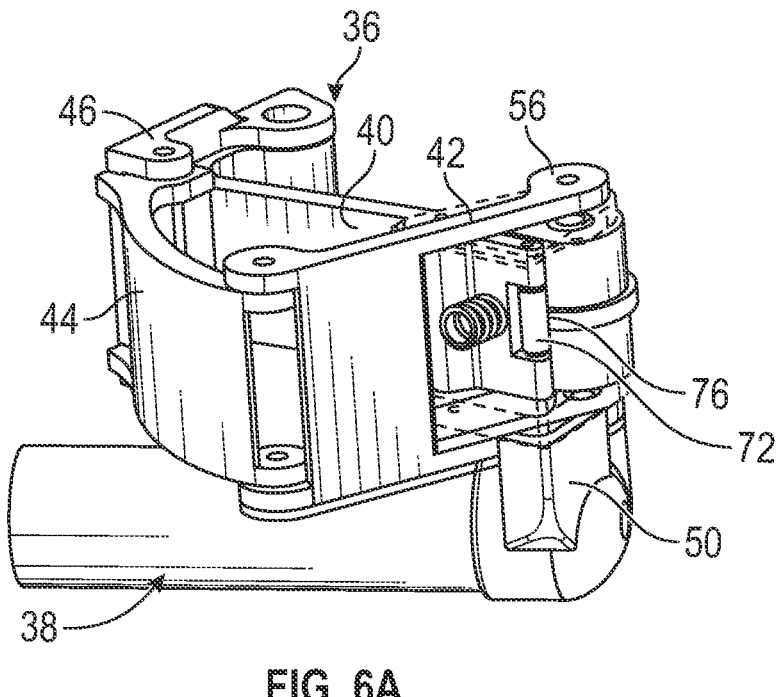
FIGS. 6A, 6B, and 6C schematically illustrate operation of the power hinge assembly of FIG. 4 during a closure member opening sequence.
Figure 6B:
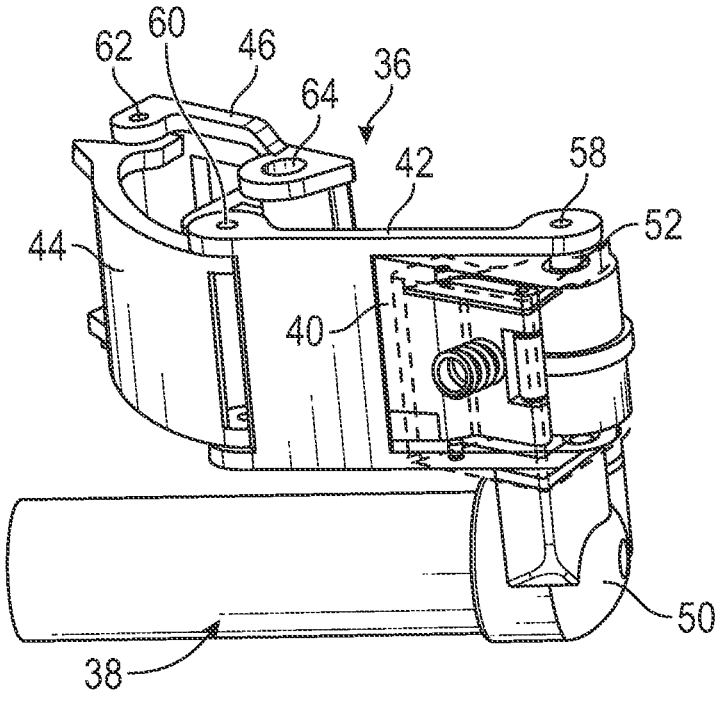
Figure 6C:
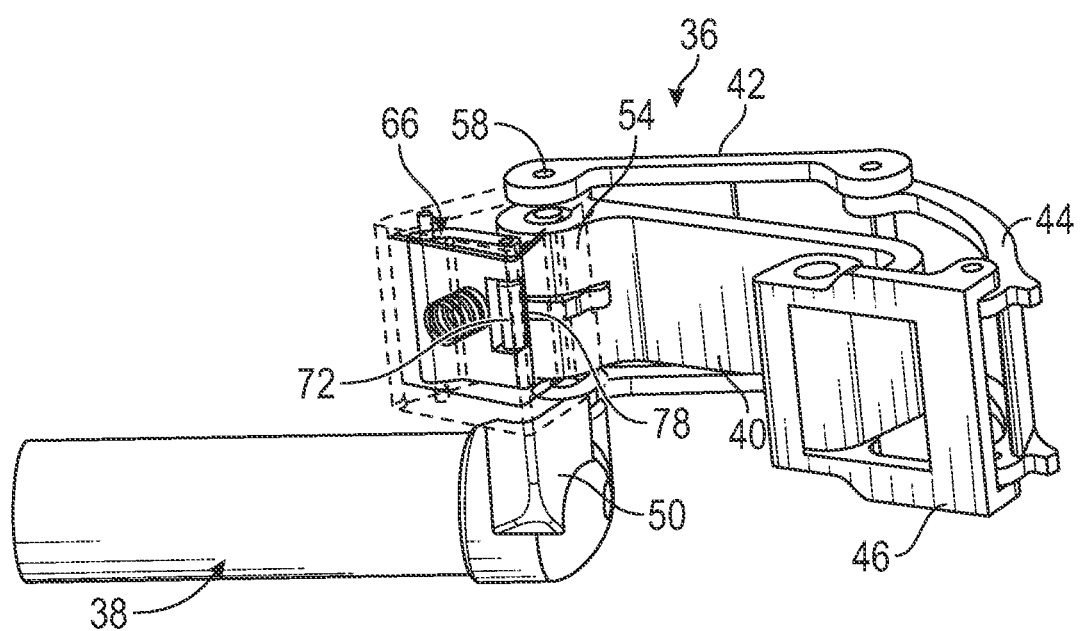

FIGS. 6A, 6B, and 6C, with continued reference to FIGS. 1-5, schematically illustrate operation of the power hinge assembly 36 during an opening sequence of the closure member 12. During the opening sequence, the closure member 12 may move from the closed position P1 to the fully open position P3.

The power hinge assembly 36 is shown in an initial position in FIG. 6A. In this position, the closure member 12 is located in the closed position P1, and thus the roller 72 of the spring loaded cam assembly 66 is received within the first detent 76.

From the initial position of FIG. 6A, the power hinge assembly 36 may move to the intermediate position shown in FIG. 6B. In this position, the closure member 12 is located in the partially open position P2. The power hinge assembly 36 may be moved to the intermediate position by actuating the drive shaft 52 of the gearbox 50 of the electric motor 38 to begin moving the drive link 42 along an arced path (here, in the clockwise direction) by rotating about the primary pivot axis 58. The drive link 42 may thus move in a direction toward the main link 40. As the drive link 42 moves, the drive link 42, the main link 40, the supporting link 44, and the first mounting plate 46 may articulate relative to one another via the secondary pivot axes 60, 62, 64, thereby permitting the closure member 12 to smoothly adjust its positions as the power hinge assembly 36 progresses through the opening sequence. Rotational movement of the drive link 42 about the primary pivot axis 58 is therefore configured to initiate the various articulations that may occur at each of the secondary pivot axes 60, 62, 64 during operation of the power hinge assembly 36.

From the intermediate position of FIG. 6B, the power hinge assembly 36 may move to the final position shown in FIG. 6C. In this position, the closure member 12 is located in the fully open positions P3, and thus the roller 72 of the spring loaded cam assembly 66 is received within the second detent 78.

As the power hinge assembly moves between the positions of FIGS. 6B and 6C, the drive link 42 may contact the main link 40 and thus allow the pivot housing 54 of the main link 40 to begin rotating about the primary pivot axis 58. The main link 40 may therefore move along an arced path that mimics that of the drive link 42 until reaching the final position of FIG. 6C. Rotational movement of the drive link 42 about the primary pivot axis 58 is therefore configured to initiate the rotational movement of the main link 40 about the primary pivot axis 58.

Although three specific positions of the power hinge assembly 36 are illustrated in FIGS. 6A, 6B, and 6C, it should be recognized that the closure member systems 22 of this disclosure could be moved between a multitude of positions during the opening sequence of the closure member 12.

Figure 7A:
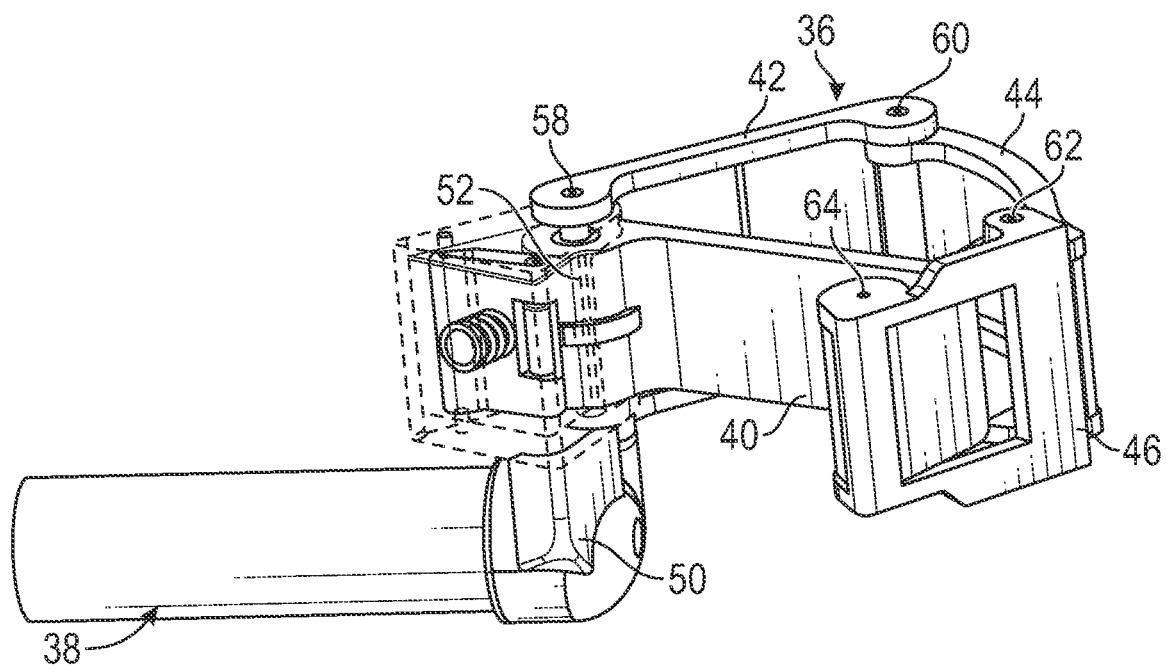
FIGS. 7A, 7B, and 7C schematically illustrate operation of the power hinge assembly of FIG. 4 during a closure member closing sequence.
Figure 7B:
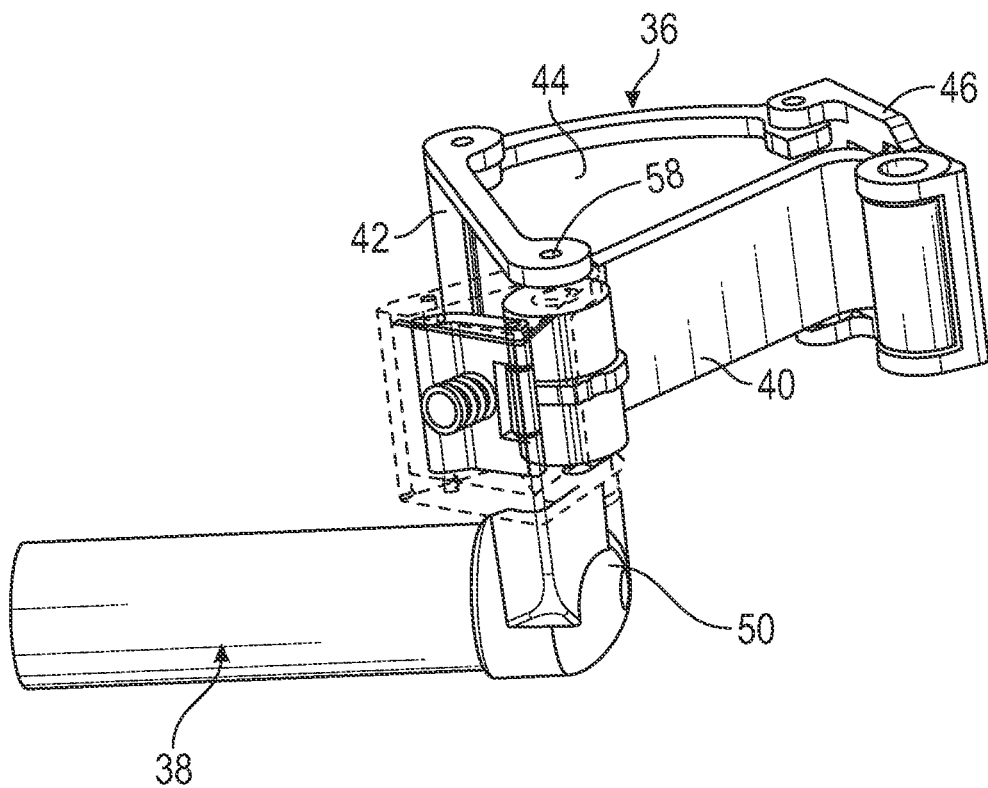
Figure 7C:
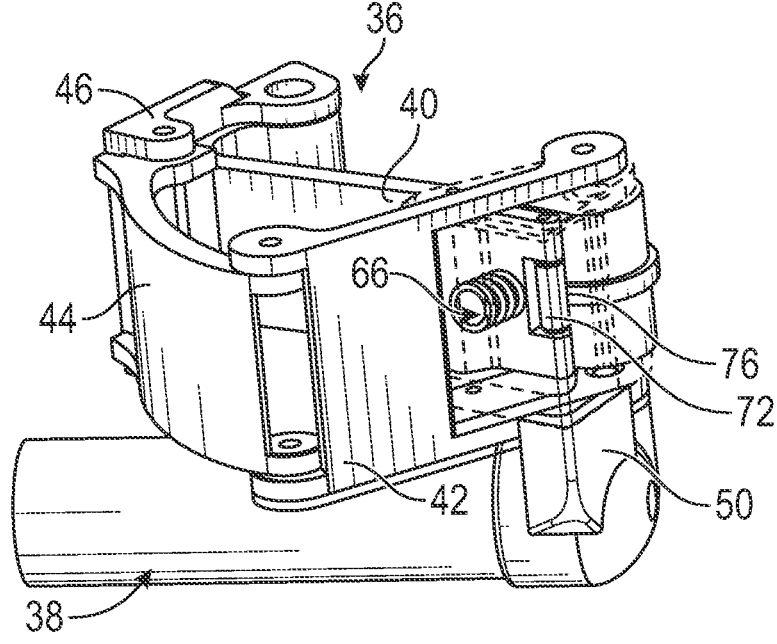

FIGS. 7A, 7B, and 7C, with continued reference to FIGS. 1-6C, schematically illustrate operation of the power hinge assembly 36 during a closing sequence of the closure member 12. During the closing sequence, the closure member 12 may move from the fully open position P3 to the closed position P1, for example.

The closing sequence of the closure member 12 may generally proceed in an opposite order from the opening sequence. Thus, an initial position of the power hinge assembly 36 during the closing sequence is the same as the final position of the power hinge assembly 36 during the opening sequence and is thus depicted in FIG. 6C. In this initial position of the closing sequence, the roller 72 of the spring loaded cam assembly 66 is received within the second detent 78.

From the initial position of FIG. 6C, the power hinge assembly 36 may move to the intermediate position shown in FIG. 7A during the closing sequence. The power hinge assembly 36 may be moved to the intermediate position by actuating the drive shaft 52 of the gearbox 50 of the electric motor 38 to begin moving the drive link 42 along an arced path (here, in the counterclockwise direction) by rotating about the primary pivot axis 58. The drive link 42 may thus begin to move in a direction away from the main link 40. As the drive link 42 moves, the drive link 42, the main link 40, the supporting link 44, and the first mounting plate 46 may articulate relative to one another via the secondary pivot axes 60, 62, 64, thereby permitting the first mounting plate 46 to change its angular positioning relative to the main link 40 and the supporting link 44. Rotational movement of the drive link 42 about the primary pivot axis 58 may therefore be configured to initiate the articulations that occur at each of the secondary pivot axes 60, 62, 64.

From the intermediate position of FIG. 7A, the power hinge assembly 36 may move to the further intermediate position shown in FIG. 7B. The drive link 42 continues rotating in the same direction (here, counterclockwise) about the primary pivot axis 58 to move from the position shown in FIG. 7A to the position shown in FIG. 7B. The main link 40, supporting link 44, and first mounting plate 46 may move in unison with the drive link 42 in light of the various connections between these linkages. The first mounting plate 46 may again change its angular position as the power hinge assembly 36 transitions from the position of FIG. 7A to the position of FIG. 7B.

From the position shown in FIG. 7B, the power hinge assembly 36 may next move to the final position shown in FIG. 7C. In this position, the closure member 12 is returned to the closed position P1, and thus the roller 72 of the spring loaded cam assembly 66 is again received within the first detent 76. The final position of the closing sequence is the same as the initial position of the opening sequence.

Although three specific positions of the power hinge assembly 36 are illustrated in FIGS. 7A, 7B, and 7C, it should be recognized that the closure member systems 22 of this disclosure could be moved between a multitude of positions during the closing sequence of the closure member 12.

In some implementations, the power hinge assembly 36 may include features for manually opening/closing the closure member 12 when the electric motor 38 and/or gearbox 50 malfunctions. These features may include but are not limited to a shaft mounted brake, a clutch, a tight-fit shaft, etc.

Figure 8:
FIG. 8 schematically illustrates a closure member swing path during both an opening sequence and a closing sequence of a closure member system.
Figure 8:
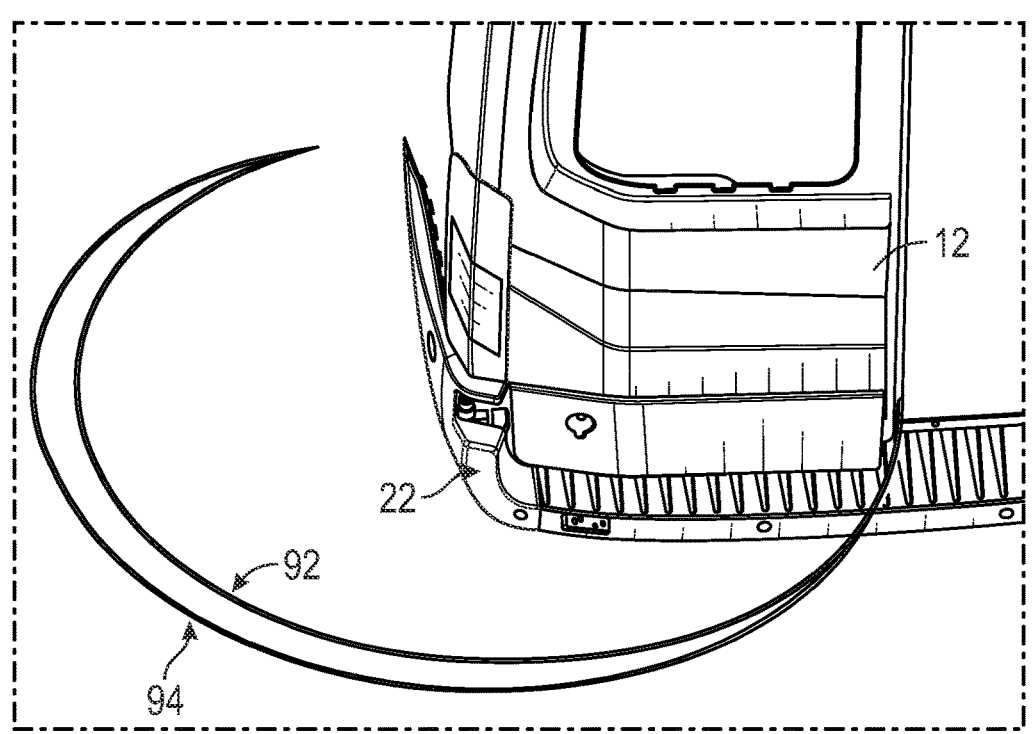

FIG. 8 schematically illustrates the respective swing paths of the closure member 12 of the closure member system 22 during both the opening sequence and the closing sequence. A first swing path 92 of the closure member 12 during the opening sequence and a second swing path 94 of the closure member 12 during the closing sequence are schematically depicted. As can be appreciated form this depiction, the second swing path 94 is a different (e.g., wider) swing path than the first swing path 92.

Figure 9A:
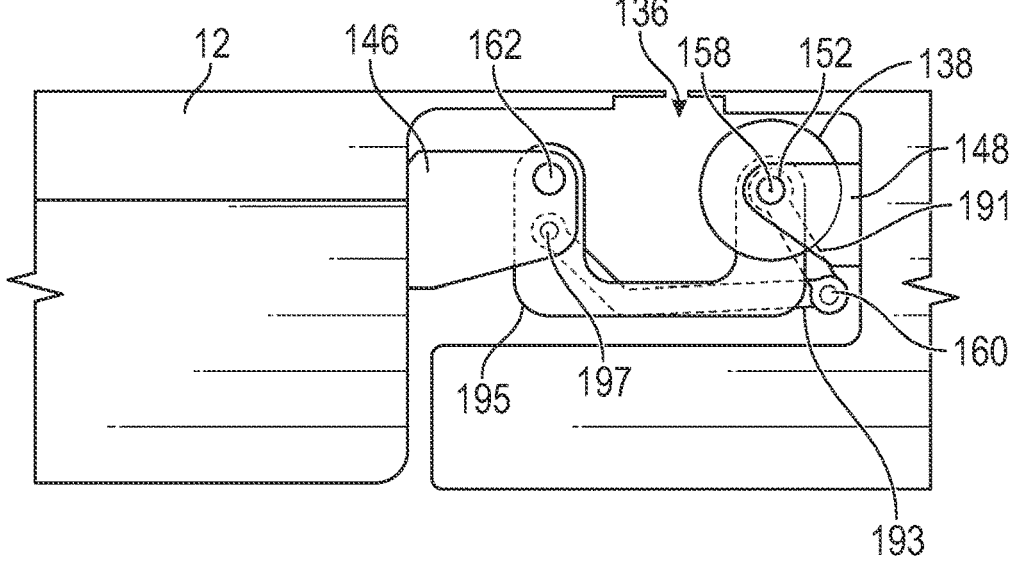
FIGS. 9A, 9B, and 9C illustrate another exemplary power hinge assembly for a closure member system.
Figure 9B:
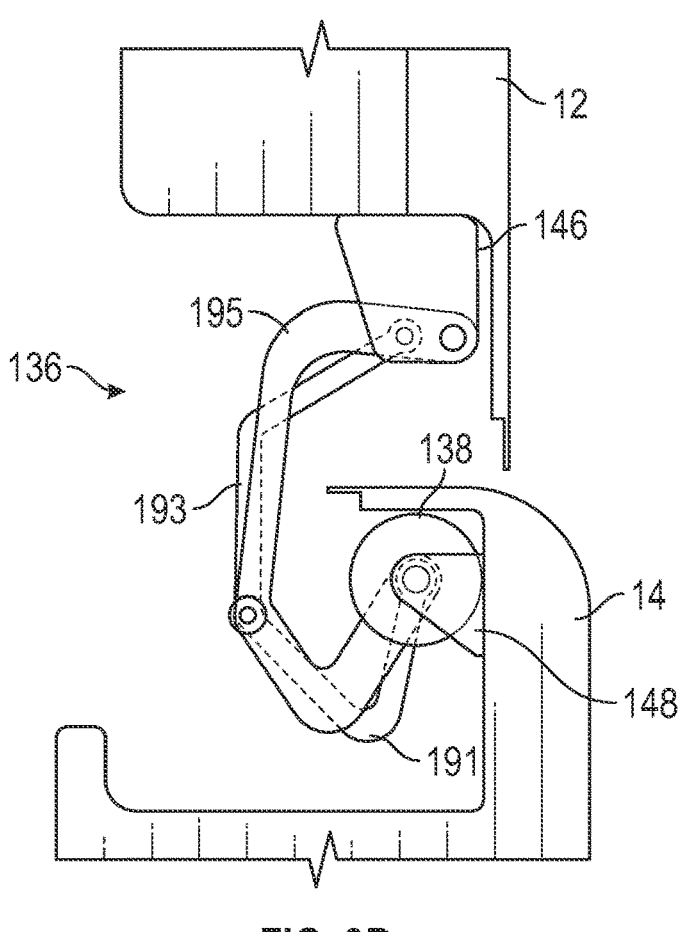
Figure 9C:
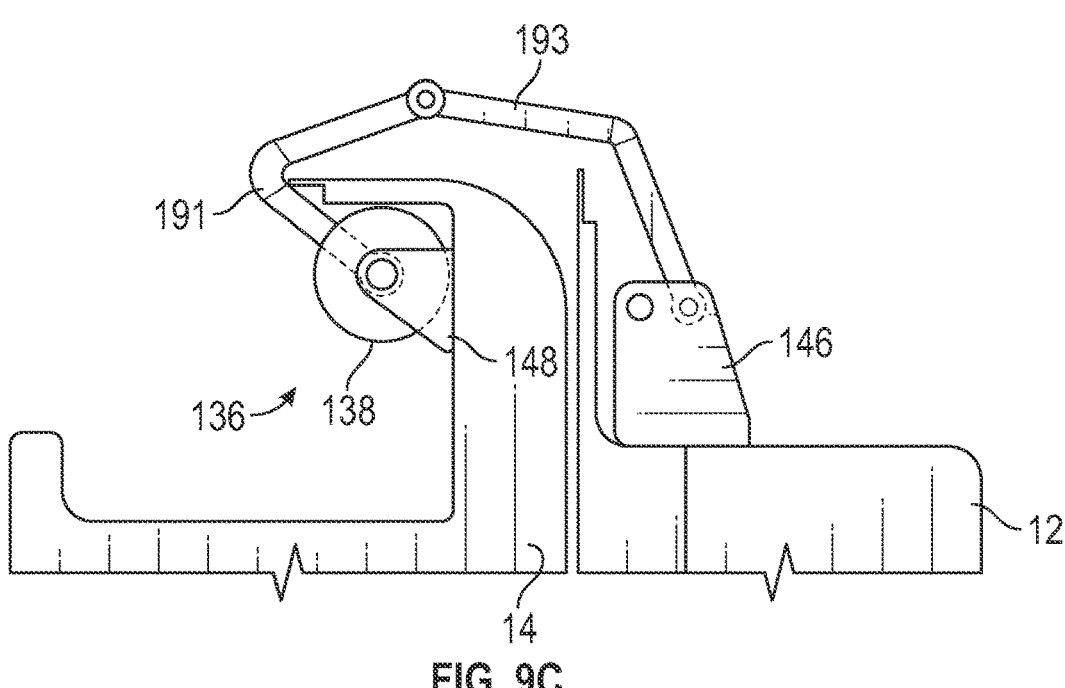

FIGS. 9A, 9B, and 9C illustrate another exemplary power hinge assembly 136 of a closure member system. FIG. 9A shows a closure member 12 of the closure member system in a closed position, FIG. 9B shows the closure member 12 in a partially open position, and FIG. 9C shows the closure member 12 in a fully open position.

The partially open position of FIG. 9B may be displaced about 90 degrees from the closed position of FIG. 9A, and the fully open position of FIG. 9C may be displaced about 100 degrees or more from the closed position of FIG. 9A. In some implementations, the fully open position is displaced by about 180 degrees from the closed position. In other implementations, the fully open position is displaced by about 270 degrees from the closed position.

The power hinge assembly 136 may include at least an electric motor 138, a drive arm 191, a drive link 193, a hinge link 195, a first mounting plate 146, and a second mounting plate 148. The electric motor 138 is configured to power movement of the closure member 12 between the closed position and the partially open position and between the partially open position and the fully open position. The electric motor 138 may be selectively powered (e.g., via a power source of the vehicle 10) to rotate a drive shaft 152. The drive shaft 152 may be fixedly connected to the drive arm 191. The drive shaft 152 may therefore establish a primary pivot axis 158 about which the drive arm 191 may rotate. Rotation of the drive shaft 152 is configured to cause the drive arm 191 to begin to move about the primary pivot axis 158 for initiating an opening sequence or a closing sequence of the closure member 12.

The drive link 193 may connect between the drive arm 191 and the hinge link 195. The drive link 193 may be operably coupled to the drive arm 191 at a first secondary pivot axis 160 and may be further operably coupled to the hinge link 195 at a link connection 197. The drive arm 191 and the drive link 193 may each articulate about the first secondary pivot axis 160 to reorient their respective positions as the power hinge assembly 136 moves between the various positions.

The hinge link 195 may connect between the drive shaft 152 and the first mounting plate 146. The hinge link 195 may be operable coupled to the first mounting plate 146 at a second secondary pivot axis 162. The hinge link 195 and the first mounting plate 146 may each articulate about the second secondary pivot axis 162 to reorient their respective positions as the power hinge assembly 136 moves between the various positions.

The power hinge assembly 136 may be mounted to the closure member 12 via the first mounting plate 146 and may further be mounted to a vehicle body 14 via the second mounting plate 148. The mounting of the power hinge assembly may be achieved in any suitable manner, including but not limited to bolting, welding, etc.

The vehicle closure member systems described herein provide a simple and robust manner for achieving automated or manual opening and closing of vehicle closure members. The proposed systems and methods may increase the speed at which goods or other items may be exchanged between authorized users and the vehicle. Users of the exemplary closure member systems can access loading docks and open the vehicle closure members without exiting the passenger cabin or while being located remotely from the vehicle and without requiring assistance from others.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle closure member system, comprising:
a closure member;
a non-powered hinge assembly mounted to the closure member; and
a power hinge assembly mounted to the closure member and adapted to move the closure member between a closed position and a fully open position,
wherein the closure member is displaced by at least 100 degrees from the closed position when moved to the fully open position,
wherein the closure member includes a first swing path when moved from the closed position to the fully open position and includes a second swing path when moved from the fully open position to the closed position, wherein the second swing path is a different swing path than the first swing path.

2. A vehicle closure member system, comprising:
a closure member;
a non-powered hinge assembly mounted to the closure member; and
a power hinge assembly mounted to the closure member and adapted to move the closure member between a closed position and a fully open position,
wherein the closure member is displaced by at least 100 degrees from the closed position when moved to the fully open position,
wherein the power hinge assembly includes an electric motor, a main link, a drive link, a supporting link, a first mounting plate, and a second mounting plate.

3. The vehicle closure member system as recited in claim 2, wherein the electric motor includes a drive shaft configured to rotate about a primary pivot axis to move the drive link along an arced path.

4. The vehicle closure member system as recited in claim 3, wherein the supporting link is connected to the drive link at a first secondary pivot axis and is connected to the first mounting plate at a second secondary pivot axis.

5. The vehicle closure member system as recited in claim 4, wherein the main link is connected to the first mounting plate at a third secondary pivot axis.

6. The vehicle closure member system as recited in claim 5, wherein the main link, the drive link, the supporting link, and the first mounting plate are configured to articulate relative to one another to reorient their respective positions as the closure member moves between the closed position and the fully open position.

7. The vehicle closure member system as recited in claim 2, wherein the closure member is mounted to the first mounting plate.

8. The vehicle closure member system as recited in claim 2, wherein the power hinge assembly further includes a spring loaded cam assembly that includes a spring, a pawl, and a roller that is mounted to the pawl.

9. The vehicle closure member system as recited in claim 8, wherein the roller is received within a first detent of a pivot housing of the main link when the closure member is in the closed position and is received within a second detent of the pivot housing when the closure member is in the fully open position.

10. The vehicle closure member system as recited in claim 1, comprising a control module configured to control movement of the closure member between the closed position and the fully open position in response to a predefined prompt or an object detection signal.

11. A vehicle, comprising:
a vehicle body;
a closure member mounted for movement relative to the vehicle body; and
a power hinge assembly configured to automatically move the closure member during an opening sequence and a closing sequence,
wherein the power hinge assembly is configured to move the closure member along a first swing path during the opening sequence and along a second, different swing path during the closing sequence.

12. The vehicle as recited in claim 11, wherein the vehicle is an autonomous vehicle and the closure member is a rear out-swinging door.

13. The vehicle as recited in claim 11, wherein the power hinge assembly includes a single electric motor, a main link, a drive link, a supporting link, a first mounting plate, and a second mounting plate.

14. The vehicle as recited in claim 13, wherein the first mounting plate is mounted to the closure member, and the second mounting plate is mounted to the vehicle body within a pocket of a panel of the vehicle body.

15. The vehicle as recited in claim 13, wherein a first rotational movement of the drive link about a primary pivot axis is configured to initiate a second rotational movement of the main link about the primary pivot axis.

16. The vehicle as recited in claim 13, wherein rotation of the drive link about a primary pivot axis is configured to initiate articulations between the drive link and the supporting link at a first secondary pivot axis, between the supporting link and the first mounting plate at a second secondary pivot axis, and between the main link and the first mounting plate at a third secondary pivot axis.

17. The vehicle as recited in claim 11, comprising a control module configured to command the power hinge assembly to move the closure member between a closed position and a fully open position in response to receiving a predefined prompt or an object detection signal.

18. The vehicle closure member system as recited in claim 1, wherein the closure member is a swinging door that is part of a dual out-swinging door system.

19. The vehicle closure member system as recited in claim 18, wherein the rear out-swinging door is mounted at a rear-most end of a motor vehicle comprising the vehicle closure member system.

* * * * *